United States Patent [19]

Suozzo

[11] 4,407,395
[45] Oct. 4, 1983

[54] MECHANICAL SHOCK AND SWAY ARRESTOR

[76] Inventor: Leonard S. Suozzo, 366 Maple Hill Dr., Hackensack, N.J. 07601

[21] Appl. No.: 305,514

[22] Filed: Sep. 25, 1981

[51] Int. Cl.³ .............................................. B60T 7/12
[52] U.S. Cl. .................................... 188/134; 188/378; 188/381; 248/550; 248/573; 248/636; 267/8 D
[58] Field of Search ............... 188/134, 378, 379, 380, 188/381; 248/550, 570, 573, 569, 636; 267/8 R, 8 D

[56] References Cited

U.S. PATENT DOCUMENTS

| | | | |
|---|---|---|---|
| 3,809,186 | 5/1974 | Suozzo | 188/128 X |
| 3,983,965 | 10/1976 | Wright, Jr. | 188/380 |
| 3,994,178 | 11/1976 | Hore | 188/134 X |
| 4,094,387 | 6/1978 | Pelat et al. | 188/381 |
| 4,177,882 | 12/1979 | Dowell et al. | 188/378 |
| 4,194,598 | 3/1980 | Suozzo | 188/134 |
| 4,236,606 | 12/1980 | Sunakoda et al. | 188/134 X |
| 4,289,218 | 8/1981 | Uraro | 188/134 |

Primary Examiner—George E. A. Halvosa
Attorney, Agent, or Firm—Donald R. Heiner

[57] ABSTRACT

A mechanical shock and sway arrestor to be interposed between piping, related equipment and a stationary support, the parts of which are constructed and arranged to automatically change the effective length of the arrestor in response to thermally induced movements of the piping and to subtantially instantaneously convert the arrestor into a rigid strut in the event that the piping is subjected to shock-loading or vibration of substantial amplitude. The arrestor includes a housing for a ball screw and a ball nut threaded over the ball screw or equivalent acme screw. The ball screw is resiliently mounted and has a flywheel secured thereto centrally diposed between two clutch plates which engage the flywheel when the screw moves in response to movement of the piping thereby effectively arresting such motion and altering the effective length of the arrestor.

8 Claims, 5 Drawing Figures

U.S. Patent
Oct. 4, 1983
4,407,395
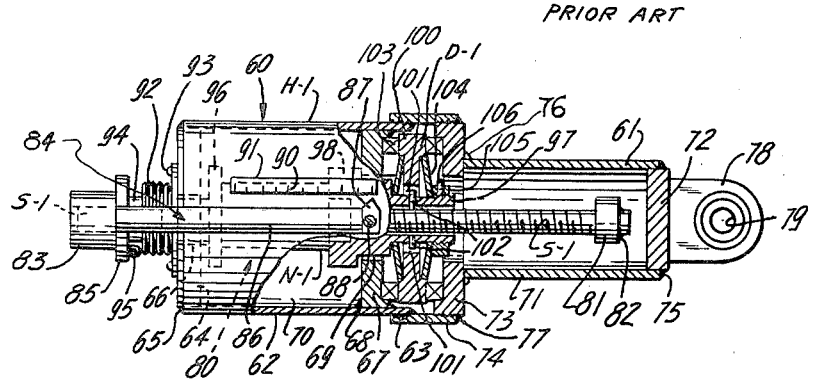
FIG. 1
PRIOR ART
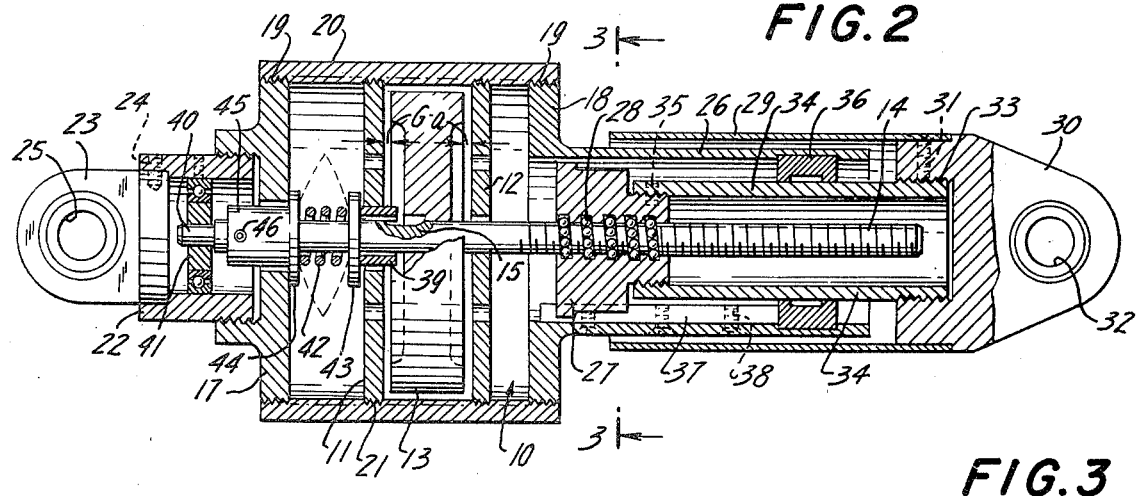
FIG. 2
FIG. 3
FIG. 4
FIG. 5

MECHANICAL SHOCK AND SWAY ARRESTOR

BACKGROUND OF THE INVENTION

This invention relates generally to those types of mechanical shock and sway arrestors that are adapted to be interposed between high-temperature, high-pressure piping or related equipment, and a stationary structure to permit normal thermally induced movement of the piping, and to substantially instantaneously convert the arrestor into a rigid strut in the event that the piping is subjected to shock-loading or vibration of substantial amplitude.

SUMMARY OF THE INVENTION

This invention relates generally to those types of mechanical shock and sway arrestors that are adapted to be interposed between high-temperature, high-pressure piping or related equipment and a stationary structure to permit normal thermally induced movement of the piping and to instantly convert to a rigid strut whenever the piping is subjected to shock-loading or vibration of substantial amplitude.

Arrestors of the type to which this invention relates are made in various sizes, each of which is designed to accommodate a certain maximum static load through a predetermined range of travel of the supported piping or related equipment and each of which must be capable, within its design limits, to (1) automatically adjust its effective length to thermally induced changes in positions of the supported piping or related equipment; (2) absorb vibrations of small amplitude without any change in the effective length; (3) substantially instantaneously convert to a rigid strut in the event of quickly applied seismic or other shock or vibration forces of substantial magnitude; and (4) provide a certain degree of "release" in the event that such seismic or other shock or vibration forces should continue.

Typical examples of such shock and sway arrestors are disclosed and claimed in U.S. Pat. No. 3,809,186 and 4,194,598, and this invention is particularly directed to improvements over the form of device illustrated in FIG. 1 of U.S. Pat. No. 3,809,186.

Although that device has functioned adequately in several different types of installations, it has been observed that improvements are needed to simplify and strengthen the construction, to readily absorb small amplitude vibrations, to reduce friction between the relatively movable parts, and to provide "release" when an applied force is continued.

The problem of "release" arises when the arrestor has been converted into a rigid strut as a result of shock-loading, and any continuing forces must be relieved by appropriate automatic adjustment of the effective length of the arrestor.

One of the improvements is to provide the device with means of an adjustable gap between a flywheel and clutch plates and an adjustable spring, thus enabling production of devices of varying characteristics.

It has also been found that the employment of ball screws in resisting vibrations, especially in low amplitudes, causes the balls in the screw to brinnell to the point that the device becomes inoperative. To eliminate this problem, one of the improvements of the unit is to substitute the ball screw with very-low-friction acme-type such as the screws produced by Wedin Corporation, of Cadillac, Michigan.

In accordance with the present invention, a flywheel is secured to a ball screw or equivalent acme screw and is centrally positoned between two clutch plates which replace the inner housing and the device shown in FIG. 1 of U.S. Pat. No. 3,809,186. The ball screw, or shaft, is resiliently mounted within a cylindrical housing and moves in response to movements of the piping. As the ball screw rotates, the flywheel engages one of the clutch plates, stops the rotating motion, locks-up as a rigid strut, and then releases as the force is removed.

As alternate embodiments, the clutch plates may be provided with cam followers or balls. In this alternate embodiment a snubber stops the motion, locks-up as a rigid strut, and is then released in the event of increased or sustained uninterrupted forces.

In either case, the release mechanism permits a sliding rotation of the wheel thus changing the effective length of the arrestor and releasing the force.

The principal object of this invention is to provide a completely mechanical arrestor which permits normal movement of piping but, in the event the piping is subjected to a shock or other abnormal displacement force, serves as a rigid strut at the instant the shock force occurs.

Another object of the invention is to provide a shock and sway arrestor which may be advantageously employed in locations that are difficult or virtually impossible of access after installation has been completed.

Another object of the invention is to provide an arrestor of the kind indicated that is simple and compact in design, that is sturdy and durable in construction, that is reasonable in manufacturing and installation costs, that does not require servicing or maintenance, and that is capable of rendering efficient and dependable service over exended time periods.

Another object of the invention is to provide a shock and sway arrestor of the type stated that is constructed to provide a minimum of friction between the relative movable parts.

With these and other objects, the nature of which will become apparent, the invention will be more fully understood by reference to the drawings, and the accompanying detailed description and claims.

IN THE DRAWINGS

FIG. 1 is a longitudinal section, partially in elevation, of the prior-art device shown in FIG. 1 of the U.S. Pat. No. 3,809,186, but using different reference numerals;

FIG. 2 is a longitudinal section of the improved mechanical shock and sway arrestor constructed in accordance with this invention;

FIG. 3 is a sectional view taken along lines 3—3 of FIG. 2;

FIG. 4 is a sectional view of the modified sway arrestor or snubber according to the present invention;

FIG. 5 is a sectional view of another embodiment of means to permit sliding rotation of the snubber according to the present invention.

DESCRIPTION OF THE PREFERRED EMBODIMENT

Before describing the present invention in detail, a brief description of the prior-art construction of FIG. 1 will be presented in order that the improvements of the present invention may be more clearly recognized and understood.

The prior-art device of FIG. 1 is said to comprise a housing H-1, a screw member S-1, a nut member N-1, and a spring device D-1.

Housing H-1 consists of a body unit 60 and a cover unit 61. Body unit 60 includes a right circular cylindrical wall 62 which is externally threaded at one end, as indicated at 63; an end wall 64 which is secured to the other end of wall 62 by welding, as indicated at 65, and which is provided with a central through opening 66; and a circular partition 67 which is spaced from and parallel to end wall 64 and is welded to wall 62, as indicted at 68. The partition is formed with a central through opening 69. The portion of the interior body unit 60 between end wall 64 and partition 67 constitutes a compartment 70.

Cover unit 61 includes an elongated tubular wall 71, an end wall 72, a ring plate 73, and a relatively short tubular wall 74 which is internally threaded at its free end for engagement with the threads 63 of wall 62. The enumerated parts of the cover unit are arranged, as illustrated, and joined by weldments 75, 76 and 77 to obtain a sturdy unitary structure. Secured to end wall 72, preferably by welding, is an ear 78 having an opening 79 for connection to a stationary structure (not shown) or to piping (also not shown).

Screw member S-1 and nut member N-1 are elements of a mechanism 80 which serves the functions of converting rectilinear movement of the screw member into rotary movement of the nut member during normal-use conditions of the arrestor and converting the arrestor into a rigid strut under abnormal-use conditions, such as when the piping is subjected to shock-loading, as will be explained in detail further along herein. Mechanism 80 is a low-friction ball screw and nut assembly and is preferably of a type manufactured by Beaver Precision Products, Inc., of Troy, Michigan.

Screw member S-1 extends through openings 66 and 69 of body unit 60 and terminates in tubular member 71 of cover unit 61. An internally threaded ring 81 is carried at the inner end of the screw member and is welded thereto, as indicated at 82. Secured to the outer end of the screw member is a sleeve 83 which is adapted to be connected to a stationary structure (not shown) or to piping (also not shown). It is recommended that the sleeve 83 be connected to a stationary support and that ear 78 may be connected to the piping, in use. Alternatively, sleeve 83 may be connected to the piping and ear 78 connected to the stationary support if desired.

A travel indicator 84 includes a ring element 85 through which the outer end of the screw member passes, and an integral arm 86 which overlies body unit wall 62 and is parallel to the axis of the screw member. A pointer 87 is secured to the free end of arm 86 and cooperates with graduations 90 on a plate 91 for indicating the axial position of the screw member relative to the housing. Plate 91 is attached to wall 62 of the body unit in any desired manner known to the art.

Interposed between ring element 85 of the travel indicator and wall 64 of housing H-1 is a bellows 92 which is coaxial with the screw member S-1. The bellows is affixed to housing wall 64 by screws or the like 93 and to the screw member, immediately adjacent ring element 85, by means of a split-clamping ring 94 and a screw 95. The bellows protects the threads of the screw member and the parts within the housing against foreign air-born particles, such as dust and dirt.

Nut member N-1 and screw member S-1 are threaded oppositely. The nut member is provided with a coaxial stop ring 96 at one end and an also coaxial tubular member 97 at its other end. The tubular member is formed with an annular flange 98 and is externally threaded at its free end. A ring member 100 is carried by tubular member 97 and is provided with a pair of oppositely formed internal slots 101. A pair of diametrically arranged pins 102 is carried by the tubular member. Each pin projects into a corresponding slot 101 whereby to prevent rotary movement and permit axial movement of tubular member 97 relative to ring member 100. The arrestor is equiped with a pair of thrust bearings 103. As illustrated, one of the thrust bearings is positioned between ring member 100 and partition 67 and the other is positioned between ring member 100 and element 73 of cover unit 61

Spring device D-1 is comprised of referred-to ring member 100 and other parts which will now be identified. Such parts include a pair of disc springs 104 which are disposed to opposite sides of ring member 100. A ring nut 105 engages the threaded end of tubular member 97. It will be evident from an examination of FIG. 1 that nut 105 is adapted to adjust the loading on the disc springs. The nut is maintained in selected adjusted position by a set screw 106.

For the purpose of describing the operation of the arrestor, it is first assumed that the arrestor is connected to a stationary structure, such as a building wall (not shown), by way of sleeve 83 and to piping (not shown), by way of ear 78.

It will be appreciated from an examination of FIG. 1 that the arrestor permits normal movement of the piping relative to the stationary structure but serves as a rigid strut in the event the piping is subjected to a sudden shock force. If, for example, the piping moves normally (due to temperature conditions) to the right, the parts are so arranged that the effective length of the arrestor is correspondingly increased. In like manner, if the piping moves normally (due to temperature conditions) to the left, the effective length of the arrestor is correspondingly decreased. In either case, screw member S-1 moves axially and nut member N-1 remains in the axial position shown in FIG. 1.

In the event that the piping is subjected to a shock force or the like, resulting axial movement of screw member S-1 relative to the housing will cause corresponding axial movement of nut member N-1, whereby its stop ring 96 will bear against housing wall 64, which serves as a stop member; or flange 98 will bear against partition 67, which also serves as a stop member, depending on the direction of axial movement of screw member S-1. This converts the arrestor into a rigid strut. Simultaneously, disc springs 104 will be further compressed and will exert a minor force opposite in direction to that of the shock force acting on the arrestor. When the shock force is relieved, the spring device automatically urges nut member N-1 in a release direction and allows the nut member and spring device D-1 to return to their illustrated normal position within housing body 60.

The instant invention will now be described referring particularly to FIGS. 2 and 3 and the alternate embodiments shown in FIGS. 4 and 5.

Referring now to FIG. 2 there is shown an improved sway and shock arrestor comprising essentially a cylindrical housing 10 having disposed therein a pair of clutch plates 11 and 12 having disposed there between a flywheel 13 which is rigidly secured to a screw member 14 by any well-known means such as a key 15 which engages a keyway of the screw or by means of threads 16 which engage threads on the periphery of the flywheel. Housing 10 essentially comprises end walls or flanges 17 and 18 both of which are externally threaded as shown at 19 for engaging internal threads in a tubular wall 20 which forms the outer cylinder of housing 10. Tubular wall 20 also has internal threads such as shown at 21 which engage external threads on the outer periphery of clutch plates 11 and 12.

Flange or end wall 17 has a central opening coaxial with screw 14 for threadably receiving a tubular extension 22 which in turn has a central opening coaxial with screw 14 for receiving an ear 23 which is secured to the tubular extension by means of a pin or set screw 24. The distal end of ear 23 has an opening 25 formed therein for slideably receiving a pin for connecting the device to a fixed support not shown.

End wall of flange 18 has a tubular extension 26 formed integrally therewith and extending coaxial of screw 14. A ball nut 27 is fixedly secured against rotation and disposed within tubular extension 26 whereby screw 14 is caused to rotate when nut 27 is moved axially as will be more fully described below.

An outer tubular member or sleeve 29 is rigidly secured to a second ear 30 by any means well-known in the art such as a pin or set screw shown as 31. This ear 30 also has an opening 32 formed therein for slideably receiving a pin for attaching this end of the device to a fixed support not shown. This ear 30 has threads 33 formed internally thereof for engaging threads on an inner sleeve 34 whose other end receives a reduced diameter end of nut 27 and this inner sleeve 34 is fixedly secured to this end of the nut by any means well-known in the art such as a pin or set screw 35.

For ease of assembly, a guide bearing 36 is disposed between inner sleeve 34 and tubular extension 26.

Tubular extension 26 is provided with a key 37 secured by screw 38 wherein key 37 fits into a keyway of nut 27 as shown in FIG. 3. The combinations of the key and keyway are provided such that housing 10, including end walls or flanges 17 and 18 and the tubular extension do not rotate when the screw rotates.

Since inner sleeve 34 is connected both to the ear 30 and the nut 27, any longitudinal displacement of ear 30 and therefore outer sleeve 29 to which it is connected, will result in nut 27 being moved axially. Axial movement of the nut in turn will result in rotation of the screw as well as axial displacement of the screw which in turn will cause the flywheel both to rotate and move axially. This movement will be more fully described below.

The previously mentioned screw 14 extends longitudinally and coaxial with the housing 10 and outer sleeve 29 and extends through central openings in clutch plates 11 and 12 and flywheel 13. Screw 14 is journalled in each of the clutch plates 11 and 12. Clutch plate 11 further has a sleeve 39 disposed in the central opening therein through which the screw 14 passes for reasons to be more fully explained below. The left end of screw 14 as viewed in FIG. 2 is supported at this end by a ball bearing 41 disposed internally of tubular extension 22.

A collar 43 is disposed about screw 14 and is in contact with sleeve 39. A second collar 44 is also disposed about screw 14 and is in spaced apart parallel relationship with collar 43. This second collar 44 is in contact with an adjustable sleeve 45 which is also disposed about screw 14 and which is secured to the screw 14 by a set screw or other fastening device shown as 46.

A spring device 42 which may be either a coil or disc spring is disposed about screw 24 and is positioned between the first and second collars 43 and 44 for reasons to be more fully explained below.

The sleeve 39 which is in contact with collar 43 provides a small distance between its opposite end surface and flywheel 13 such that the system remains unactivated at low amplitude vibrations.

In the event of a small movement of the ear 30 in an axial direction, either left or right as viewed in FIG. 2, screw 14 will be caused to move axially, either left or right as viewed in FIG. 2, thereby closing the gap shown as GA and the flywheel 13 will thus engage either clutch plate 11 or clutch plate 12, depending on the direction of movement, thereby preventing further axial movement.

As can be seen in FIG. 2, the flywheel 13 engages clutch plate 11 under a compression force and engages clutch plate 12 under a tension force while the spring is activated by collar 43 in compression and collar 44 in tension.

A slight modification of the clutch plates 11 and 12 is shown in FIG. 4 and a further modification of clutch plates 11 and 12 is shown in FIG. 5.

In FIG. 4, there is shown a threaded cam member threadably connected by means of a nut 49 and extending through an opening formed in clutch plates 11 and 12. A camming surface engages opposite face surfaces of flywheel 13 when the screw member 14 is moved axially left or right as viewed in FIGS. 2 and 4 thereby closing gap shown as Gb, thereby stopping the axial motion whereby the device becomes a rigid strut member. Should the axial force continue in the same direction a sliding rotation of flywheel 13 is caused by the interaction of the cam surface mating with the face surface of flywheel 13 thus changing the effective length of the arrestor and releasing the force.

In FIG. 5 it is shown that a ball 50 may be disposed between clutch plates 11 and 12 and the opposite face surfaces of flywheel 13 providing essentially the same effect as the camming action.

Member 48 serves to stop axial motion and, in the event of a continued force in the same direction, its rounded cam surface permits a sliding rotation of the wheel thus changing the effective length of the arrestor and thereby releasing the force.

In any of the modifications or in the preferred embodiment, flywheel 13 serves to dampen or absorb vibrations by providing rotary momentum or motion while coil or disc spring 42 will absorb major shocks which would cause large axial movements of screw member 14. After the shock has subsided, such as when the piping returns to a normal position, the spring releases the screw member 14 and the flywheel 13 is thus free to rotate.

Having described and illustrated the invention in connection with specific embodiments, other modifications will become apparent to those skilled in the art without departing from the scope of the invention which is defined in the appended claims.

What is claimed is:

1. A mechanical shock and sway arrestor adapted to be interposed between piping and a stationary support for said piping wherein said mechanical shock and sway arrestor comprises a housing having a tubular wall having first and second end walls which are externally threaded for engaging internal threads of said tubular wall and wherein said first end wall has a first central opening for threadably receiving a tubular extension which in turn has a central opening for receiving an ear which is secured to said tubular extension by screw means which ear connects one end of said arrestor to said fixed support; said second end wall having a second tubular extension formed integrally therewith and extending longitudinally thereof; an outer sleeve disposed about said second tubular extension and extending coaxial therewith and secured to a second ear which second ear connects one end of said arrestor to said piping; said second ear having internal threads for engaging threads on an inner sleeve which extends longitudinally of said second tubular extension and said outer sleeve and coaxial therewith; a ball nut fixedly secured against rotation and disposed within said second tubular extension and connected to one end of said inner sleeve; first and second parallel and spaced apart clutch plates disposed in said housing having external threads formed on their periphery for engaging internal threads formed in said tubular wall and having central openings formed there through; a flywheel disposed in said housing and between said clutch plates and having a central opening formed there through coaxial with said central openings formed in said clutch plates; a screw member disposed in said housing and extending longitudinally and coaxial with said inner and outer sleeves and said second tubular extension and extending through said central openings formed through said clutch plates and said flywheel and through a threaded opening formed through said ball nut; a first collar disposed about said screw member in said housing and disposed between said first end wall and said first clutch plate and coating with a sleeve disposed in said central opening formed in said first clutch plate; a second collar disposed about said screw member in spaced apart parallel relationship with said first collar and disposed in said housing and disposed between said first collar and said first end wall said second collar coacting with an adjustable sleeve which is also disposed about said screw member; a spring disposed in said housing about said screw member and positioned between said first and said second collars; and, a ball bearing disposed in said central opening of said threaded tubular extension for rotatably supporting said screw member whereby in response to longitudinally axial movement of said piping causing said inner and outer sleeves and said screw member to also move axially, in either direction, one of said clutch plates will engage said flywheel stopping further axial movement and forming a rigid strut of the mechanical shock and sway arrestor and effectively shortening its length which will be returned to its normal length by said spring when the axial force is removed.

2. The mechanical shock and sway arrestor of claim 1 wherein a guide bearing is disposed between said inner sleeve and said second tubular extension to facilitate assembly of the device.

3. The mechanical shock and sway arrestor of claim 1 wherein said second tubular extension is provided with a key secured by a screw wherein said key fits into a keyway formed in said ball nut such that said housing including said end walls and said tubular extensions do not rotate when said screw rotates.

4. The mechanical shock and sway arrestor of claim 1 wherein said sleeve which is in contact with said first collar provides a small distance between its opposite end surface and said flywheel such that the system remains unactivated at low amplitude vibrations.

5. The mechanical shock and sway arrestor of claim 1 wherein a cam member is threadably connected to and extends through an opening formed in said first and second clutch plates whereby the camming surface engages opposite face surfaces of said flywheel when said screw member is moved axially left or right thereby stopping the axial motion whereby said mechanical shock and sway arrestor becomes a rigid strut member.

6. The mechanical shock and away arrestor of claim 1 wherein a ball is disposed between said first and said second clutch plates and the opposite face surfaces of said flywheel whereby when said screw member is moved axially left or right the axial motion is stopped whereby said mechanical shock and sway arrestor becomes a rigid strut member.

7. The mechanical shock and sway arrestor of claim 1 wherein said spring is a coil spring.

8. The mechanical shock and sway arrestor of claim 1 wherein said spring is a disc spring.

* * * * *